United States Patent [19]
Kawasaki et al.

[11] Patent Number: 5,300,229
[45] Date of Patent: Apr. 5, 1994

[54] PROCESS FOR REMOVING COLORED COMPONENTS FROM SOLVENT FOR POLYACRYLONITRILE

[75] Inventors: Shiro Kawasaki; Noriyuki Kohara, both of Okayama, Japan

[73] Assignee: Japan Exlan Company Limited, Osaka, Japan

[21] Appl. No.: 9,940

[22] Filed: Jan. 27, 1993

[30] Foreign Application Priority Data

Feb. 14, 1992 [JP] Japan .................. 4-061253

[51] Int. Cl.$^5$ .......................................... B01D 61/00
[52] U.S. Cl. .................... 210/651; 210/652
[58] Field of Search ............... 210/652, 652, 653, 654, 210/650, 692, 490, 691

[56] References Cited

U.S. PATENT DOCUMENTS

| | | | |
|---|---|---|---|
| 4,011,160 | 3/1977 | Chamberlin et al. | 210/692 |
| 4,737,290 | 4/1988 | Kobashi et al. | 210/635 |
| 4,758,347 | 7/1988 | Henz et al. | 210/654 |
| 4,794,152 | 12/1988 | Kobashi et al. | |
| 4,865,744 | 9/1989 | Härtling et al. | 210/654 |
| 4,911,844 | 3/1990 | Linder et al. | 210/654 |
| 5,201,943 | 4/1993 | Monnerat | 210/652 |

FOREIGN PATENT DOCUMENTS 0465968 1/1992 European Pat. Off. .

OTHER PUBLICATIONS

Patent Abstract of Japan, vol. 3, No. 114 (C-59) Sep. 21, 1979 & JP-A-54 096126 (Kanebo K.K.) Jul. 30, 1979.
Patent Abstract of Japan, vol. 10, No. 4 (C-322) Jan. 9, 1986 & JP-A-60 166 087 (Hitachi Plantkensetsu K.K.) Aug. 29, 1985.
European Search Report dated Jun. 14, 1993.

*Primary Examiner*—Robert A. Dawson
*Assistant Examiner*—Ana M. Fortuna
*Attorney, Agent, or Firm*—Armstrong, Westerman, Hattori, McLeland & Naughton

[57] ABSTRACT

A process for removing colored components from a recovered inorganic solvent of polyacrylonitrile, without an appreciable decrease in the concentration of active components, using a reverse osmosis membrane whose NaCl rejection is in the range of 10% to 97%, under a permeation pressure lower than 20 kg/cm$^2$.

2 Claims, 1 Drawing Sheet

PROCESS FOR REMOVING COLORED COMPONENTS FROM SOLVENT FOR POLYACRYLONITRILE

The present invention relates to a process for removing colored components from a solvent for polyacrylonitrile by filtration through a reverse osmosis membrane (RO membrane for short hereinafter).

The process of producing acrylic fiber involves the steps of recovering and recycling an inorganic solvent. The repeatedly used solvent contains colored components originating from polymerization by-products and low-molecular-weight acrylic polymer which have dissolved and accumulated in the coagulating bath.

Removal of such colored components from a recovered solvent may be accomplished in several ways. Adsorption by activated carbon (or any other adsorbents) is a common means to separate coloring substances. However, it is not so effective. Gel filtration by a polymer gel is another means to separate colored components from useful components. Separation of colored components from an aqueous solution of thiocyanate may be accomplished by a recrystallization process that utilizes the difference in solubility of thiocyanate and colored components or by distillation under the acidic condition that converts thiocyanate into thiocyanic acid in order to recover thiocyanic acid. Recovery of ammonium thiocyanate may be accomplished by distillation under reduced pressure or by selective extraction with an organic polar solvent.

The above-mentioned processes have both merits and demerits. Adsorption by activated carbon depends on the affinity of the colored components for activated carbon. It also needs the periodic regeneration of the activated carbon by baking or with chemical reagents because activated carbon is limited in adsorption capacity. Moreover, it inevitably permits fine particles of activated carbon to enter the treated liquid. It has an additional disadvantage that it cannot remove highly ionic colored components.

Gel filtration through a polymer gel permits nearly complete separation but suffers a disadvantage of giving rise to a recoveredsolvent which is so dilute that concentration is necessary before reuse. In addition, filtration has to be carried out batchwise and it has relatively small treating capacity.

Recrystallization of thiocyanate from its aqueous solution suffers a disadvantage of requiring one to concentrate the solution to a great extent because of the high solubility of thiocyanate. In addition, recrystallization needs a large amount of energy for cooling.

Distillation under the acidic condition suffers a disadvantage that an acid added into the thiocyanate vaporizes thiocyanic acid which is a toxic gas posing a problem associated with operators' health.

The present invention was completed to address the above-mentioned problems. It is an object of the present invention to provide a process for almost completely removing colored components from recovered solvents of polyacrylonitrile (PAN for short hereinafter) and it is applicable to a large scale process.

The present invention is based on the finding that it is possible to remove colored components while keeping the concentration of active components in the solvent, if the recovered solvent is filtered through an adequate RO membrane.

The gist of the present invention resides in a process for removing colored components from an inorganic solvent of polyacrylonitrile recovered and recycled, said process comprising filtering the solvent through a reverse osmosis membrane whose NaCl rejection is in the range of 10% to 97%. The process of the present invention permits the removal of colored components, with the permeate keeping almost the same concentration of active components as in the recovered solvent.

The invention will be described in more detail in the following. PAN as used herein denotes either AN homopolymers and AN copolymers composed of more than 50% AN and any known unsaturated compound (comonomer) capable of copolymerization with AN.

The RO membrane used in the present invention should be one which has an NaCl rejection in the range of 10% to 97%, preferably 30% to 60%. With a lower rejection than specified, the RO membrane will permit the permeation of colored components of comparatively low molecular weight, resulting in an incomplete removal of colored components. With a higher rejection than specified, the RO membrane will require a high pressure for the processing. Moreover, it will not permit the permeation of active components of solvent, causing colored components to remain in the concentrate, with the permeate decreasing in the concentration of active components. Incidentally, the NaCl rejection of the RO membrane is one which is determined under the condition that a 0.2% NaCl aqueous solution is processed under a pressure of 10 kg/cm$^2$ until a recovery in the permeate reaches 30%.

The RO membrane specified above may be made of any material with an adequate solvent resistance, such as polyolefin, polysulfone, polyamide, and acetyl cellulose. It may have charged groups introduced into the surface thereof. Incidentally, treating conditions should be selected in the normal use of said membrane.

The RO membrane is applied to the processing of a recovered inorganic solvent of PAN. Preferred examples of the inorganic solvent include aqueous solutions of thiocyanate, zinc chloride, and nitric acid. The recovered solvent needs no pretreatment unless it has an extreme temperature or pH which hinders the normal use of the RO membrane. However, it will need preliminary filtration if it contains solid contaminants.

It has not been fully elucidated why the process of the present invention permits the removal of colored components without a substantial decrease in the concentration of active components despite the considerable high NaCl rejection of the RO membrane. A possible reason is that solutes vary in distribution coefficient for bound water in the membrane and free water in the system and the above-mentioned solutes have a higher distribution coefficient than that of NaCl.

To further illustrate the invention, and not by way of limitation, the following examples are given.

BRIEF DESCRIPTION OF FIGURE

The sole figure is a schematic representation of the process of the invention.

EXAMPLE 1

Figure 1:
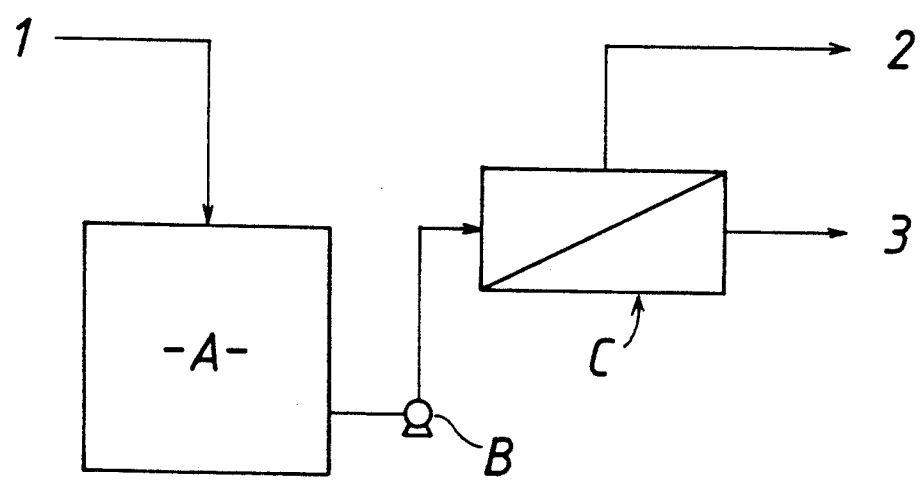

Referring to FIG. 1, which is a flow sheet pertaining to this example, there are shown a feed 1, a concentrate 2 (containing colored components), and a permeate 3 (free from colored components). The feed 1 is supplied to the feed tank A and then fed under pressure by the delivery pump B to the RO membrane module C. The permeate 3 is a solution of which colored components have been removed by the RO membrane.

The process as shown in the flow sheet was carried out to remove colored components from the feed 1 using the RO membrane module C. The feed 1 is a recovered aqueous solution containing 15.2% sodium thiocyanate, with pH 6.4 and APHA color 180. The RO membrane module is provided with a replaceable RO membrane of crosslinked polyvinyl alcohol (60% NaCl rejection), made on an experimental basis in the laboratory of Japan Exlan Co., Ltd. Permeation was performed under a pressure of 10 kg/cm$^2$.

The permeate 3 was found to have APHA color 0 and to contain 15.1% sodium thiocyanate. Thus, it turned out that the process in this example effectively removes colored components while hardly decreasing the concentration of sodium thiocyanate.

EXAMPLE 2

The same procedure as in Example 1 was repeated except that the feed was replaced by a 48.9% sodium thiocyanate aqueous solution with pH 6.4 and APHA color 1025. The permeate 3 was found to have APHA color 100 and to contain 45.3% sodium thiocyanate. It turned out that the process in this example can be applied to a feed of high concentration under a comparatively low pressure of 10 kg/cm$^2$.

EXAMPLE 3

The same procedure as in Example 1 was repeated except that the RO membrane was replaced by the one made of crosslinked polyvinyl alcohol (10% NaCl rejection). The permeate 3 was found to have APHA color 110, which indicates an adequate removal of colored components, and to contain as much sodium thiocyanate as the feed. The same procedure as in Example 1 was also repeated except that the RO membrane was replaced by the one made of polysulfone (50% NaCl rejection). The permeate 3 was found to have APHA color 18 and to contain as much sodium thiocyanate as the feed. It turned out that the same results are obtained even when the material of the RO membrane is changed.

EXAMPLE 4

The same procedure as in Example 1 was repeated except that the feed was replaced by the one with APHA color 206, containing 18.8% zinc chloride. The permeate 3 was found to have APHA color 8 and to contain 18.7% zinc chloride. It turned out that the process in this example permits the removal of colored components with a slight decrease in the concentration of active components.

COMPARATIVE EXAMPLE 1

The same procedure as in Example 1 was repeated except that the RO membrane was replaced by the one made of crosslinked polyvinyl alcohol having 99% NaCl rejection or 7% NaCl rejection.

The first membrane allowed permeation (under a pressure of 40 kg/cm$^2$) only at an industrially unacceptable low speed which is approximately one-hundredth that in Example 1. In addition, it gave rise to a small quantity of permeate containing only a small amount (less than 1%) of sodium thiocyanate, with the active components remaining largely in the concentrate.

The second membrane allowed permeation at a sufficiently high speed without decrease in the concentration of sodium thiocyanate. However, it gave rise to a permeate having APHA color 171, which indicates its inadequacy for the removal of colored components.

The foregoing demonstrates that the process of the present invention permits the removal of colored components from a recovered PAN solvent by reverse osmosis under a pressure lower than 20 kg/cm$^2$ without an appreciable decrease in the concentration of active components in the permeate. It can be readily applied to any recovered inorganic solvents incapable of distillation for regeneration. Thus the present invention is of great industrial value.

What we claim is:

1. A process for removing colored components from a recovered and recycled inorganic solvent for polyacrylonitrile, the solvent containing active components, said process comprising filtering the solvent through a reverse osmosis membrane to produce a permeate, the membrane having a NaCl rejection in the range of 10 to 97%, so that the colored components are retained by the membrane while keeping the concentration of active components in the permeate substantially same as that in the recovered inorganic solvent.

2. A process as defined in claim 1, wherein the solvent for polyacrylonitrile is an aqueous solution of a compound selected from the group consisting of thiocyanate, zinc chloride and nitric acid.

* * * * *